United States Patent
Montgomery et al.

(10) Patent No.: US 10,655,711 B2
(45) Date of Patent: May 19, 2020

(54) SINGLE ANGULAR CONTACT BALL RAMP FOR DRIVEN TURBOCHARGER

(71) Applicant: SuperTurbo Technologies, Inc., Loveland, CO (US)

(72) Inventors: Marc Montgomery, Loveland, CO (US); Ryan Sherill, Loveland, CO (US)

(73) Assignee: SuperTurbo Technologies, Inc., Loveland, CO (US)

( * ) Notice: Subject to any disclaimer, the term of this patent is extended or adjusted under 35 U.S.C. 154(b) by 0 days.

(21) Appl. No.: 15/947,578

(22) Filed: Apr. 6, 2018

(65) Prior Publication Data
US 2019/0309832 A1 Oct. 10, 2019

(51) Int. Cl.
| F16H 13/14 | (2006.01) |
| F02B 39/04 | (2006.01) |
| F16H 13/08 | (2006.01) |

(52) U.S. Cl.
CPC .............. *F16H 13/14* (2013.01); *F02B 39/04* (2013.01); *F16H 13/08* (2013.01)

(58) Field of Classification Search
CPC .......... F16H 13/02; F16H 13/04; F16H 13/06; F16H 13/08; F16H 13/14; F16H 47/04; F16H 47/065; F16H 47/08; F02B 39/04; F02B 37/105; Y02T 10/144
See application file for complete search history.

(56) References Cited

U.S. PATENT DOCUMENTS

| 2,886,986 A | 4/1957 | Kopp |
| 4,541,305 A * | 9/1985 | Hamabe ................. F16H 13/08 475/184 |
| 4,617,838 A | 10/1986 | Anderson |
| 5,385,514 A * | 1/1995 | Dawe ..................... F16H 13/06 475/336 |
| 8,561,403 B2 | 10/2013 | VanDyne et al. |
| 8,668,614 B2 | 3/2014 | Sherrill et al. |
| 9,217,363 B2 | 12/2015 | Riley et al. |
| 9,581,078 B2 | 2/2017 | Brinks et al. |
| 9,670,832 B2 | 6/2017 | Sherrill et al. |
| 2007/0049449 A1* | 3/2007 | Klassen ................. F16H 13/08 475/196 |

(Continued)

FOREIGN PATENT DOCUMENTS

| CN | 2010800658285 | 12/2015 |
| WO | 2011/096936 A1 | 8/2011 |

*Primary Examiner* — Jacob S. Scott
*Assistant Examiner* — Lori Wu
(74) *Attorney, Agent, or Firm* — William W. Cochran; Cochran Freund & Young LLC

(57) ABSTRACT

A planetary traction drive for a driven turbocharger utilizes angular contact ball ramps to provide variable clamping depending on torque throughput. The ball ramps are located between ring rollers and a ring gear, and function to locate the ring gear concentrically to the ring rollers. The angled contact axes of the ball ramps allows use of a low conformity contact between the balls and ball races in the ball ramps to provide efficient movement, while simultaneously locating ring gear concentrically to the traction rings. A variation is shown where only a single angular contact ball ramp is used between the ring gear and a clamping traction ring, and the other traction ring is rigidly fixed to the ring gear to reduce part count and complexity.

10 Claims, 6 Drawing Sheets

(56) References Cited

U.S. PATENT DOCUMENTS

| | | | |
|---|---|---|---|
| 2010/0031935 A1* | 2/2010 | VanDyne | F02B 37/105 |
| | | | 123/559.1 |
| 2010/0199666 A1 | 8/2010 | VanDyne et al. | |
| 2011/0034295 A1* | 2/2011 | Brinks | F16H 13/08 |
| | | | 475/331 |
| 2011/0150383 A1 | 6/2011 | Yoshida et al. | |
| 2012/0165151 A1 | 6/2012 | Sherrill et al. | |
| 2013/0017920 A1 | 1/2013 | Sherrill et al. | |
| 2013/0123059 A1* | 5/2013 | Mizuno | F16H 13/06 |
| | | | 475/183 |
| 2016/0061308 A1 | 3/2016 | Oishi | |
| 2018/0106347 A1 | 4/2018 | Montgomery et al. | |

\* cited by examiner

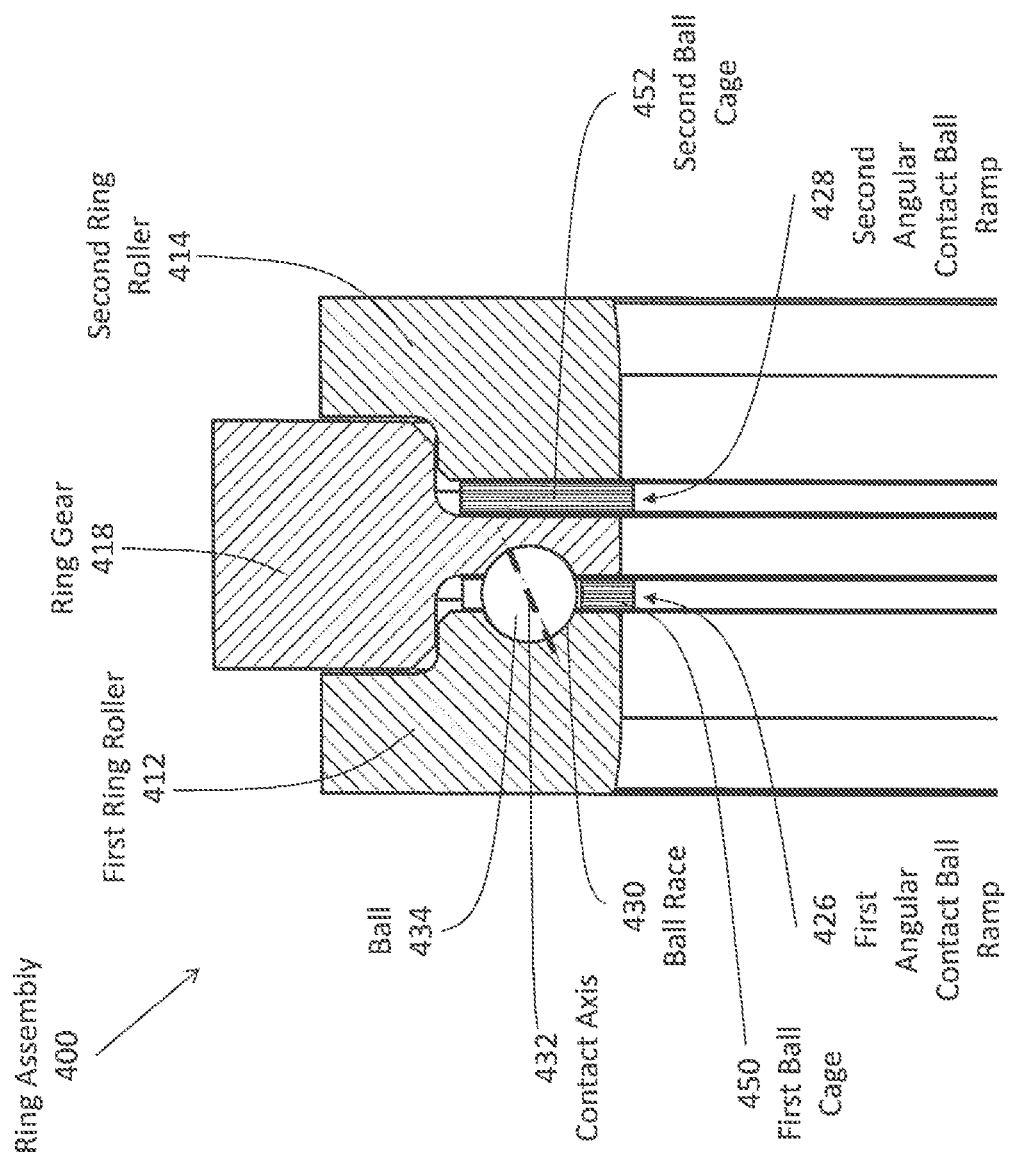

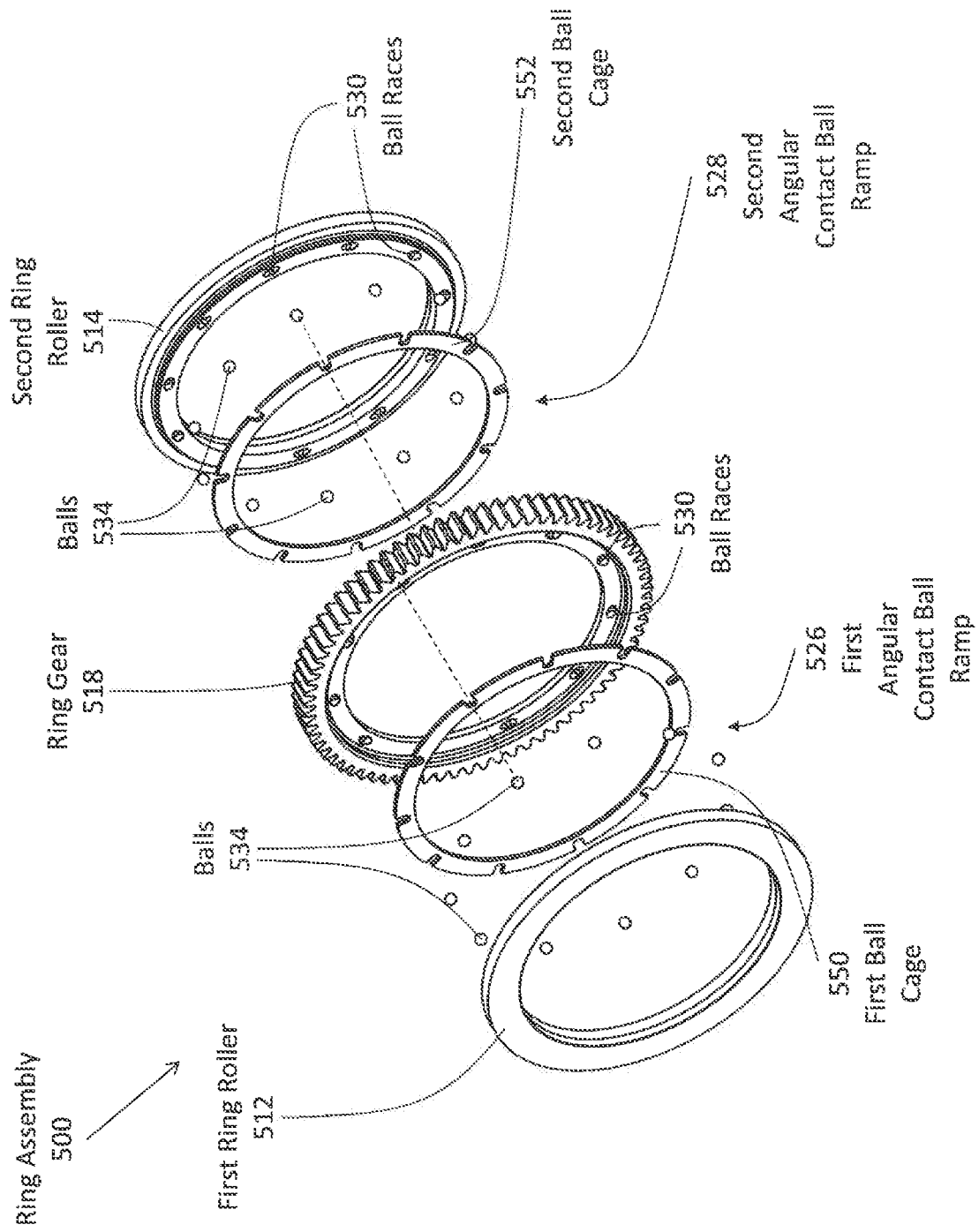

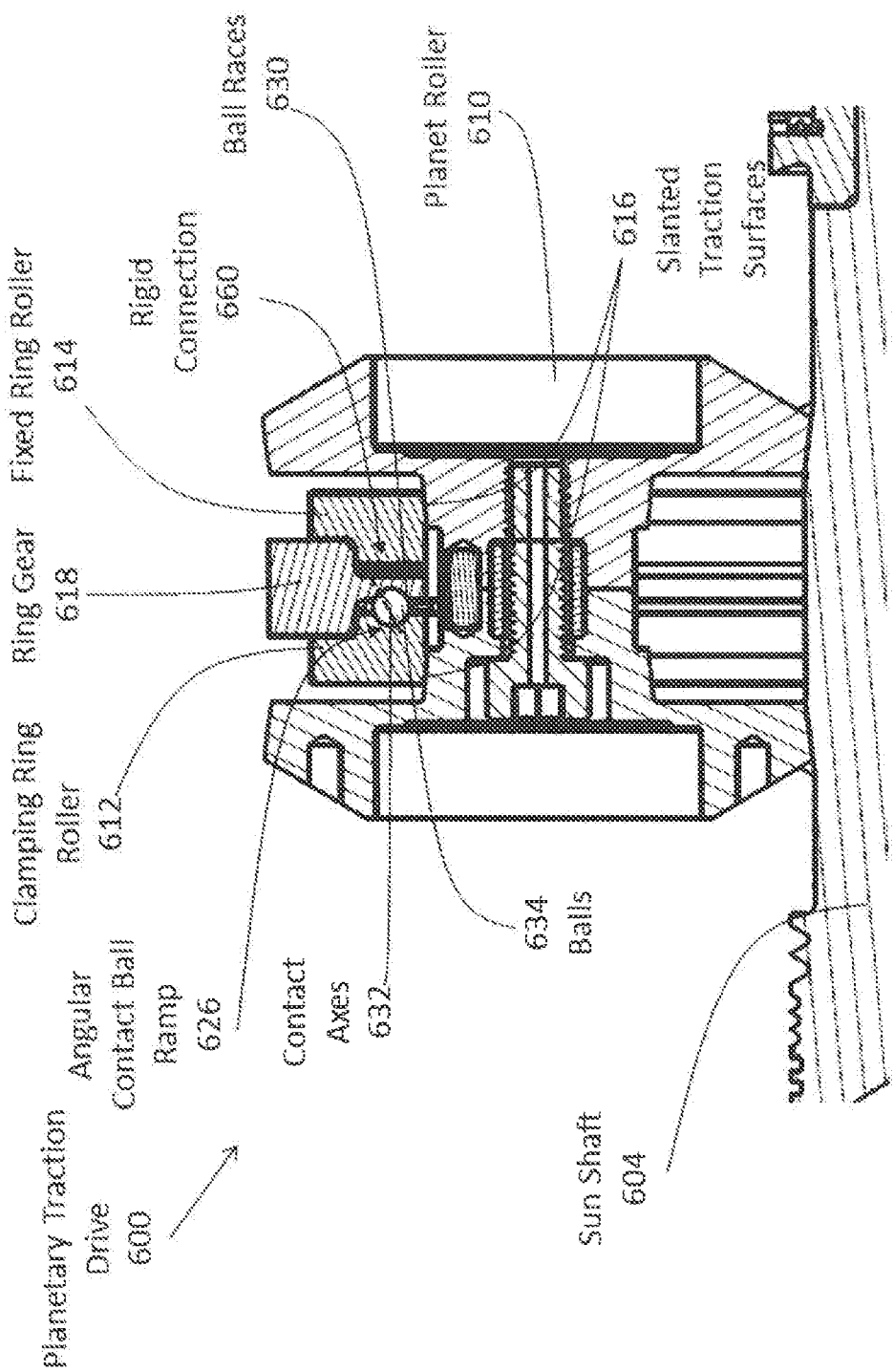

SINGLE ANGULAR CONTACT BALL RAMP FOR DRIVEN TURBOCHARGER

BACKGROUND

Driven turbochargers are an improvement over normal turbochargers since driven turbochargers (super-turbochargers) are powered by more than just the exhaust gas turbine, which reduces turbo-lag in boosted engines. Driven turbochargers can also direct excess turbine power back to the engine to increase engine efficiency.

SUMMARY

An embodiment of the present invention may therefore comprise a driven turbocharger for an engine comprising: a turbo shaft; a compressor connected to a first location on the turbo shaft; a turbine connected to a second location on the turbo shaft; a planetary traction drive that interfaces with the turbo shaft to transmit power to and from the turbo shaft, the planetary traction drive comprising: a plurality of planet rollers that interface with the turbo shaft; a clamping ring roller and a fixed ring roller that interface with slanted traction surfaces on the plurality of planet rollers; a ring gear positioned centrally that interfaces with the clamping ring roller through an angular contact ball ramp and with the fixed ring roller through a rigid connection, such that the angular contact ball ramp increases clamping forces in the planetary traction drive when torque through the ring gear increases, where the angular contact ball ramp is comprised of a plurality of balls in ball races with angled contact axes and are shaped to have a low conformity of the balls in the ball races to provide high efficiency movement of the balls in the ball races, and the angled contact axes locate the ring gear concentrically to the clamping ring roller; a transfer gear that meshes with the ring gear that transfers power to and from the engine through a transmission.

An embodiment of the present invention may therefore further comprise a method of providing clamping forces in a planetary traction drive comprising: providing a sun shaft; interfacing a plurality of planet rollers to the sun shaft; interfacing a clamping ring roller and a fixed ring roller to the plurality of planet rollers through slanted traction surfaces on the plurality of planet rollers; providing a ring gear centrally located between the clamping ring roller and the fixed ring roller; coupling the ring gear to the clamping ring roller through an angular contact ball ramp, and to the fixed ring roller through a rigid connection such that the angular contact ball ramp increases clamping forces in the planetary traction drive when torque through the ring gear increases, where the angular contact ball ramp is comprised of a plurality of balls in ball races with angled contact axes and are shaped to have a low conformity of the balls in the ball races to provide high efficiency movement of the balls in the ball races, and the angled contact axes locate the ring gear concentrically to the clamping ring roller.

An embodiment of the present invention may therefore further comprise a planetary traction drive comprising: a sun shaft; a plurality of planet rollers that interface with the sun shaft; a clamping ring roller and a fixed ring roller that interface with slanted traction surfaces on the plurality of planet rollers; a ring gear positioned centrally that interfaces with the clamping ring roller through an angular contact ball ramp and with the fixed ring roller through a rigged connection, such that the angular contact ball ramp increases clamping forces in the planetary traction drive when torque through the ring gear increases, where the angular contact ball ramp is comprised of a plurality of balls in ball races with angled contact axes and are shaped to have a low conformity of the balls in the ball races to provide high efficiency movement of the balls in the ball races, and the angled contact axes locate the ring gear concentrically to the clamping ring roller.

BRIEF DESCRIPTION OF THE DRAWINGS

FIG. 4 is a zoomed-in cross section of an embodiment of a ring assembly for the planetary traction drive of FIG. 2.

FIG. 5 is an exploded view of an embodiment of a ring assembly for the planetary traction drive of FIG. 2.

FIG. 6 is a cross section of an embodiment of a planetary traction drive with a single angular contact ball ramp and a fixed ring roller.

DETAILED DESCRIPTION OF THE EMBODIMENTS

Figure 1:
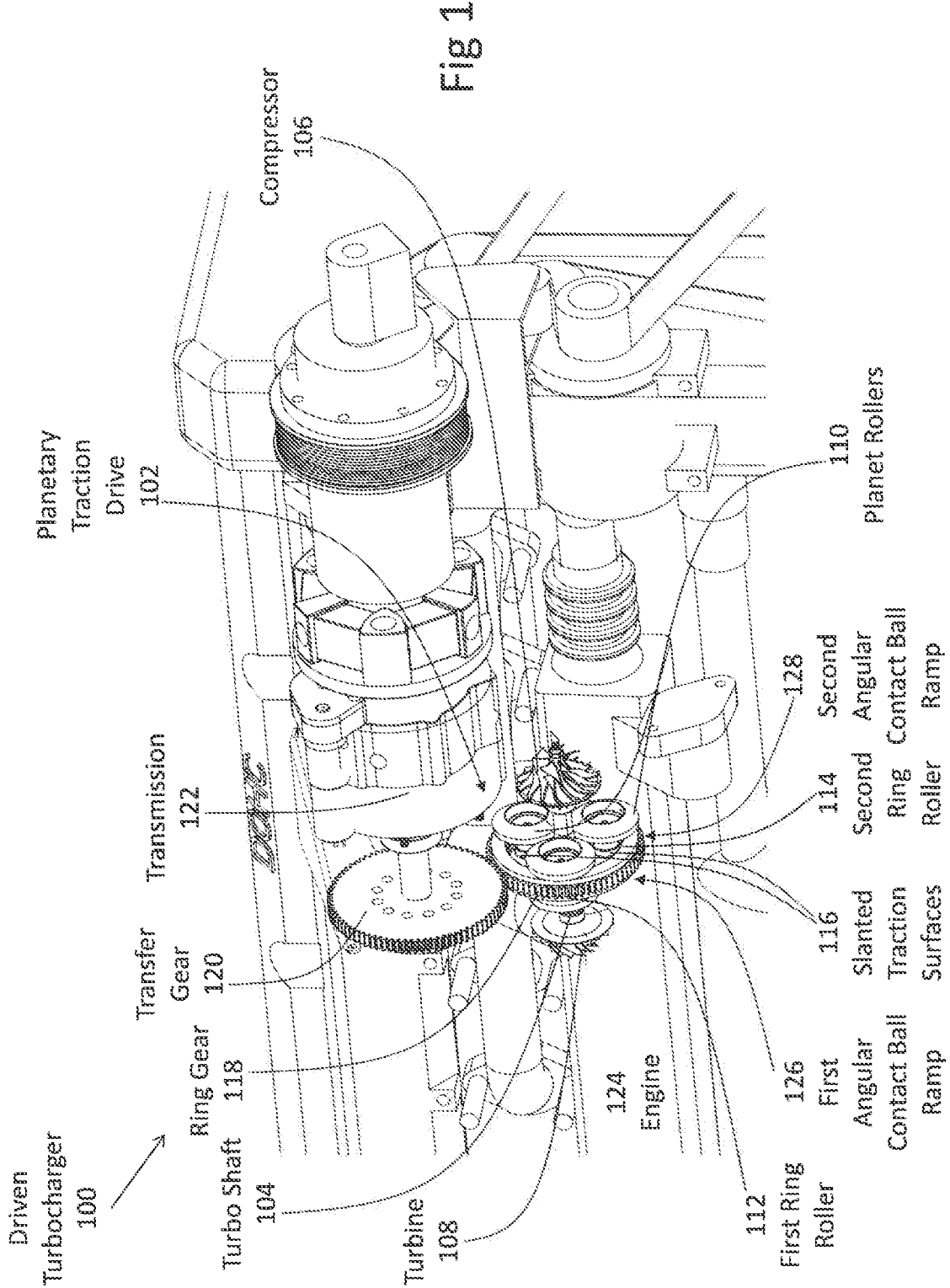
FIG. 1 is an isometric view of a driven turbocharger with a planetary traction drive.

FIG. 1 is an isometric view of a driven turbocharger 100 with a planetary traction drive 102. Turbo shaft 104 is connected to compressor 106 and turbine 108. Planetary traction drive 102 interfaces with turbo shaft 104 to transmit power to and from turbo shaft 104. Planetary traction drive 102 is composed of a plurality of planet rollers 110 that interface with turbo shaft 104, a first ring roller 112 and a second ring roller 114 that interface with slanted traction surfaces 116 on planet rollers 110, and a ring gear 118. Ring gear 118 meshes with transfer gear 120, which in turn is coupled to transmission 122. Transmission 122 transmits power between engine 124 and planetary traction drive 102. Ring gear 118 interfaces with first ring roller 112 and second ring roller 114 through first angular contact ball ramp 126 and second angular contact ball ramp 128. When torque is applied to ring gear 118, first angular contact ball ramp 126 and second angular contact ball ramp 128 push first ring roller 112 and second ring roller 114 away from ring gear 118. This, in turn, increases normal forces on slanted traction surfaces 116 of planet rollers 110, and increases clamping forces in planetary traction drive 102. The increased clamping force increases the torque capacity of planetary traction drive 102 with increased levels of torque throughput, so that the efficiency and life characteristics of planetary traction drive 102 are improved. During high torque transmission operation, first angular contact ball ramp 126 and second angular contact ball ramp 128 provide a high level of clamping force in planetary traction drive 102 to prevent slip, and during low torque transmission operation, first angular contact ball ramp 126 and second angular contact ball ramp 128 relax the clamping force in planetary traction drive 102 to improve the life and efficiency of planetary traction drive 102.

The operation of driven turbocharger 100 is as taught in U.S. Pat. No. 8,561,403, issued Oct. 22, 2013, entitled "Super-Turbocharger Having a High Speed Traction Drive and a Continuously Variable Transmission," U.S. Pat. No. 8,668,614, issued Mar. 11, 2014, entitled "High Torque Traction Drive," U.S. Pat. No. 8,608,609, issued Dec. 17, 2013, entitled "Symmetrical Traction Drive," and U.S. Pat.

No. 9,670,832 issued Jun. 6, 2017, entitled "Thrust Absorbing Planetary Traction Drive Superturbo." U.S. Pat. Nos. 8,561,403, 8,668,614, 8,608,609 and 9,670,832, are specifically incorporated herein by reference for all that they disclose and teach.

Figure 2:
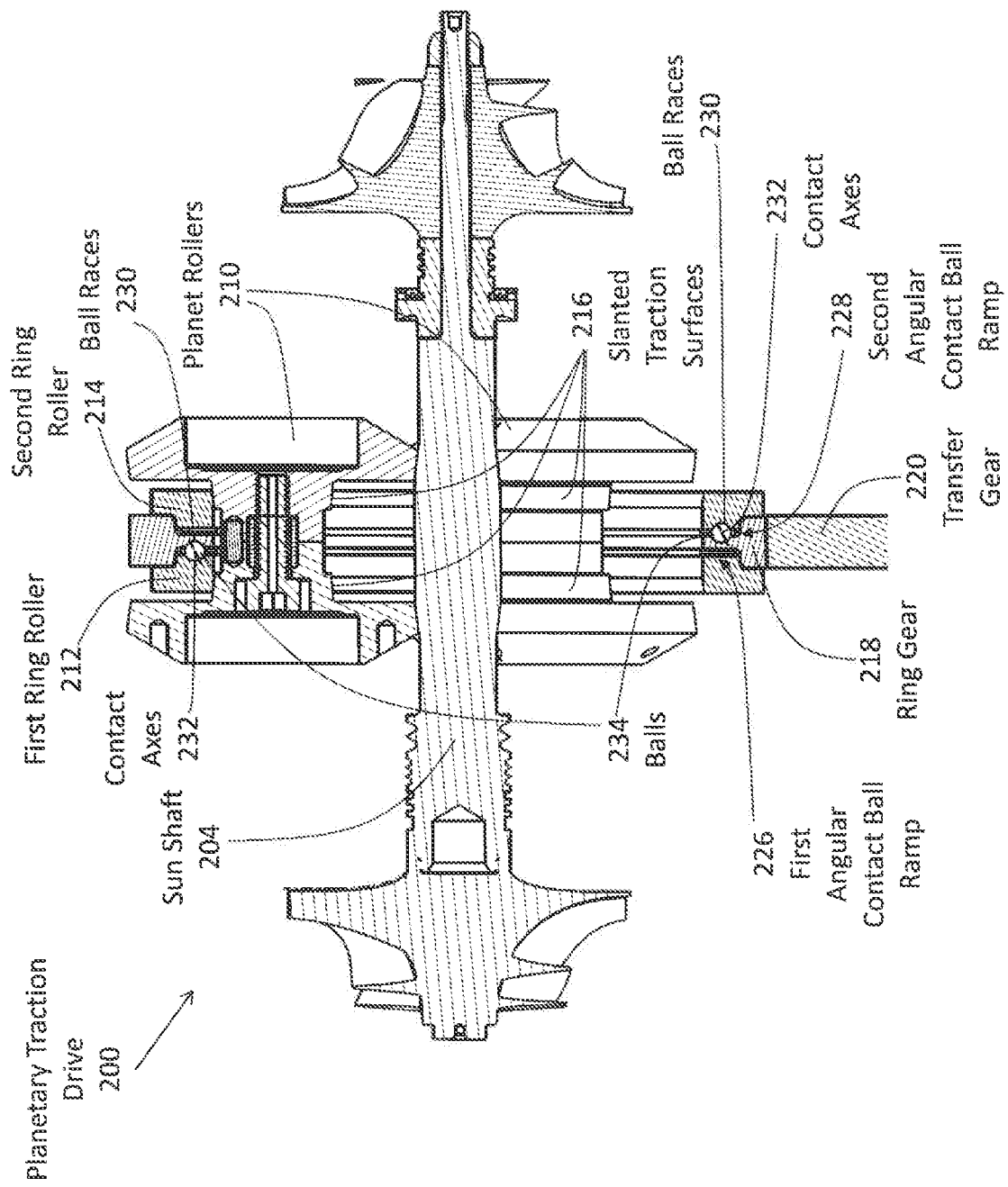
FIG. 2 is a cross section of an embodiment of a planetary traction drive with angular contact ball ramps.

FIG. 2 is a cross section of an embodiment of a planetary traction drive 200 with angular contact ball ramps 226, 228. When torque is applied to ring gear 218, first angular contact ball ramp 226 and second angular contact ball ramp 228 push first ring roller 212 and second ring roller 214 away from ring gear 218, which increases normal forces on slanted traction surfaces 216 of planet rollers 210, providing increased clamping forces to planetary traction drive 200 to increase its torque capacity. The normal forces between planet rollers 210 and sun shaft 204 are also increased. Sun shaft 204 corresponds to turbo shaft 104 in FIG. 1. Ball races 230 of first angular contact ball ramp 226 and second angular contact ball ramp 228 are slanted in two directions, so that they operate with torque in either direction through planetary traction drive 200. Ring gear 218 meshes with transfer gear 220 to transmit power to and from planetary traction drive 200. Ring gear 218 is entirely located through first angular contact ball ramp 226 and second angular contact ball ramp 228, and has no additional support bearings, so it is necessary that first angular contact ball ramp 226 and second angular contact ball ramp 228 maintain ring gear 218 concentric to first ring roller 212 and second ring roller 214, both for balanced rotation of ring gear 218 and to maintain proper meshing of ring gear 218 and transfer gear 220. First angular contact ball ramp 226 and second angular contact ball ramp 228 are comprised of a plurality of balls 234 located in a plurality of ball races 230. Contact axes 232 of first angular contact ball ramp 226 and second angular contact ball ramp 228, where balls 234 contact ball races 230, are angled with components in both the axial and radial directions. This constrains ring gear 218 to a proper, concentric location, even with point contacts between balls 234 and ball races 230, which allows for low conformity between balls 234 and ball races 230, where the radius of curvature of ball races 230 is larger than the radius of balls 234. This low conformity is beneficial for first angular contact ball ramp 226 and second angular contact ball ramp 228, as it reduces rolling friction of balls 234 in ball races 230, increasing the efficiencies of first angular contact ball ramp 226 and second angular contact ball ramp 228, and providing more linear clamping of planetary traction drive 200. If contact axes 232 were not angled, and were purely in an axial direction, very high conformity of balls 234 in ball races 230 would be necessary to hold ring gear 218 concentric to first ring roller 212 and second ring roller 214, which would increase friction, lower efficiency, and increase wear in the ball ramps. Additionally, the low conformity of balls 234 in ball races 230 allows balls 234 to have a range of diameters while still providing proper function to first angular contact ball ramp 226 and second angular contact ball ramp 228. The diameter of balls 234 can be adjusted to compensate for a range of tolerances of parts in planetary traction drive 200, and can be used to set a desired preload of normal forces on slanted traction surfaces 216 of planet rollers 210.

Figure 3:
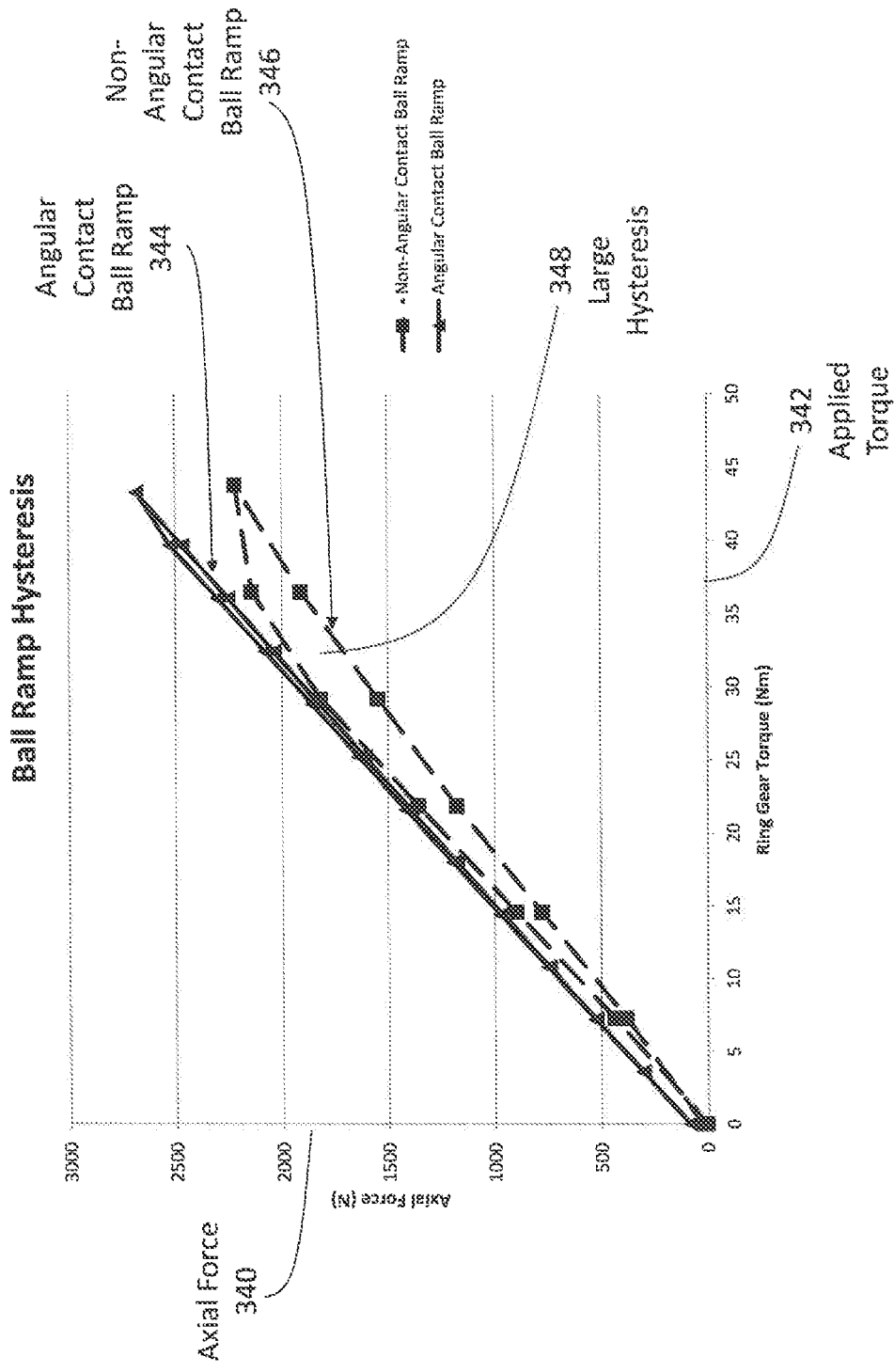
FIG. 3 is a plot of axial force vs. applied torque for an angular contact ball ramp and a non-angular contact ball ramp.

FIG. 3 is a plot of axial force 340 vs. applied torque 342 for an angular contact ball ramp 344 and a non-angular contact ball ramp 346. The non-angular contact ball ramp 346 has high conformity races necessary to locate ring gear 218 from FIG. 2. Because of this high conformity, the non-angular contact ball ramp 346 has a high amount of friction as it is loaded. This leads to lower performance, as seen by the lower slope of axial force 340 to applied torque 342, as well as large hysteresis 348 when the non-angular contact ball ramp 346 is unloaded. This large hysteresis 348 results in over-clamping of the planetary traction drive 200 from FIG. 2 during some operating conditions, lowering the efficiency and life of the planetary traction drive 200. The angular contact ball ramp 344 has lower conformity races, as the angular contact axes provide the necessary alignment of ring gear 218. This allows for low rolling friction and high efficiency in angular contact ball ramp 344. As a result, the performance of angular contact ball ramp 344 is higher, with very little hysteresis, so the clamping force on planetary traction drive 200 is more consistent, leading to higher efficiency and life of planetary traction drive 200.

FIG. 4 is a zoomed-in cross section of an embodiment of a ring assembly 400 for the planetary traction drive 200 of FIG. 2. Ring gear 418 is centrally located, with first ring roller 412 and second ring roller 414 located on each side. First angular contact ball ramp 426 and second angular contact ball ramp 428 couple first ring roller 412 and second ring roller 414 to ring gear 418, and force first ring roller 412 and second ring roller 414 away from ring gear 418 when torque is applied to ring gear 418. Shown is a single ball 434 in a ball race 430 of first angular contact ball ramp 426 of the plurality of balls in ball races for both first angular contact ball ramp 426 and second angular contact ball ramp 428. Contact axis 432 of ball 434 in ball race 430 is angled, so that contact axis 432 has components in both the radial and axial directions. This allows for ring gear 418 to be held concentrically to first ring roller 412 and second ring roller 414 by first angular contact ball ramp 426 and second angular contact ball ramp 428, while allowing a lower conformity of ball 434 in ball race 430. Also shown are first ball cage 450 and second ball cage 452, which may be used to help locate the balls such as ball 434 in first angular contact ball ramp 426 and second angular contact ball ramp 428. As can be seen, the ball races, such as ball race 430, of first angular contact ball ramp 426 and second angular contact ball ramp 428 are staggered on ring gear 418, so that forces on ring gear 418 from first angular contact ball ramp 426 and second angular contact ball ramp 428 are distributed more evenly, and thinner material can be used.

FIG. 5 is an exploded view of an embodiment of a ring assembly 500 for the planetary traction drive 200 of FIG. 2. First ring roller 512 and second ring roller 514 are located on opposite sides of ring gear 518, and interface to ring gear 518 through first angular contact ball ramp 526 and second angular contact ball ramp 528. Balls 534 are located in ball races 530, such that when torque is applied to ring gear 518, balls 534 roll in ball races 530 to force first ring roller 512 and second ring roller 514 away from ring gear 518. Additionally, first ball cage 550 and second ball cage 552 may be used to help locate balls 534 in first angular contact ball ramp 526 and second angular contact ball ramp 528. As shown, ball races 530 from first angular contact ball ramp 526 and second angular contact ball ramp 528 are staggered on ring gear 518, to even out forces on ring gear 518 from first angular contact ball ramp 526 and second angular contact ball ramp 528 and allow for use of thinner material.

FIG. 6 is a cross section of an embodiment of a planetary traction drive 600 with a single angular contact ball ramp 626 and a fixed ring roller 614. Instead of using two symmetric angular contact ball ramps as shown in FIG. 2, only one angular contact ball ramp 626 is used to provide clamping forces in planetary traction drive 600. Clamping ring roller 612 interfaces with ring gear 618 through angular contact ball ramp 626. As in FIG. 2, contact axes 632 of balls 634 are angled with components in both the axial and radial directions, which allows for angular contact ball ramp 626 to locate ring gear 618 concentrically to clamping ring roller 612 with low conformity of balls 634 in ball races 630. Fixed ring roller 614 is attached to an opposite side of ring gear 618 through a rigid connection 660. This rigid connection 660 comprises bolts, welds, or any other method of rigid attachment. Rigid connection 660 locates fixed ring roller 614 concentrically to ring gear 618, so that clamping ring roller 612, ring gear 618, and fixed ring roller 614 are all mutually concentric during operation of planetary traction drive 600. The use of rigid connection 660, instead of a second angular contact ball ramp, reduces part count, cost, and complexity of planetary traction drive 600.

When torque is applied to planetary traction drive 600, of FIG. 6, clamping ring roller 612 rotates in relation to ring gear 618 to actuate angular contact ball ramp 626. Angular contact ball ramp 626 forces clamping ring roller 612 away from ring gear 618, which increases normal forces on slanted traction surfaces 616 of planet roller 610 from clamping ring roller 612 and fixed ring roller 614. In addition, the normal forces on sun shaft 604 from planet roller 610 increase. In this way, as torque is applied to planetary traction drive 600, angular contact ball ramp 626 increases the normal forces in planetary traction drive 600, increasing the torque capacity of planetary traction drive 600, as necessary. The rotation of clamping ring roller 612 relative to ring gear 618, when angular contact ball ramp 626 is actuated, results in a rotation of clamping ring roller 612 relative to fixed ring roller 614, as fixed ring roller 614 is attached to ring gear 618. This requires that clamping ring roller 612 and fixed ring roller 614 are allowed to slip relative to slanted traction surfaces 616 of planet roller 610. However this differential translation is easily absorbed through the planetary traction drive 600, as the planetary traction drive 600 operates with an inherent level of slip. If clamping ring roller 612 and fixed ring roller 614 require pure rolling-only contact with planet roller 610, this rotation of clamping roller 612, relative to fixed ring roller 614, would not work, but the inherent level of slip in planetary traction drive 600 allows for this capability of single-sided operation of angular contact ball ramp 626.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A driven turbocharger for an engine comprising:
    a turbo shaft;
    a compressor connected to a first location on said turbo shaft;
    a turbine connected to a second location on said turbo shaft;
    a planetary traction drive that interfaces with said turbo shaft to transmit power to and from said turbo shaft, said planetary traction drive comprising:
        a plurality of planet rollers that interface with said turbo shaft;
        a clamping ring roller and a fixed ring roller that interface with slanted traction surfaces on said plurality of planet rollers;
        a ring gear positioned centrally that interfaces with said clamping ring roller through an angular contact ball ramp and with said fixed ring roller through a rigid connection, such that said angular contact ball ramp increases clamping threes in said planetary traction drive when torque through said ring gear increases, where:
            said angular contact ball ramp is comprised of a plurality of balls on ball races with angled contact axes that are angled with components in both the axial and radial directions to constrain said ring gear concentrically to said clamping ring roller;
        a transfer gear that meshes with said ring gear that transfers power to and from said engine through a transmission.

2. The driven turbocharger of claim 1 where a ball cage helps locate said plurality of balls in said angular contact ball ramp.

3. The driven turbocharger of claim 1 where diameters of said plurality of balls in said angular contact ball ramp are selected to set a desired preload of normal forces on said slanted traction surfaces on said plurality of planet rollers.

4. A method of providing clamping forces in a planetary traction drive comprising:
    providing a sun shaft;
    interfacing a plurality of planet rollers to said sun shaft;
    interfacing a clamping ring roller and a fixed ring roller to said plurality of planet rollers through slanted traction surfaces on said plurality of planet rollers;
    providing a ring gear centrally located between said clamping ring roller and said fixed ring roller;
    coupling said ring gear to said clamping ring roller through an angular contact ball ramp, and to said fixed ring roller through a rigid connection such that said angular contact ball ramp increases clamping forces in said planetary traction drive when torque through said ring gear increases, where:
    said angular contact ball ramp is comprised of a plurality of balls on ball races with angled contact axes that are angled with components in both the axial and radial directions to constrain said ring gear concentrically to said clamping ring roller.

5. The method of claim 4 further comprising:
    providing a ball cage to help locate said balls in said angular contact ball ramp.

6. The method of claim 4 further comprising:
    connecting a turbine and a compressor to said sun shaf to form a turbo shaft;
    meshing said ring gear with a transfer gear that connects said planetary traction drive to a transmission that transmits power between said planetary traction drive and an engine to form a driven turbocharger.

7. The method of claim 4 where selecting diameters of said plurality of balls in said angular contact ball ramp set a desired preload of normal forces on said slanted traction surfaces on said plurality of planet rollers.

8. A planetary traction drive comprising:
    a sun shaft;
    a plurality of planet rollers that interface with said sun shaft;
    a clamping ring roller and a fixed ring roller that interface with slanted traction surfaces on said plurality of planet rollers;

a ring gear positioned centrally that interfaces with said clamping ring roller through an angular contact ball ramp and with said fixed ring roller through a rigid connection, such that said angular contact hall ramp increases clamping forces in said planetary traction drive when torque through said ring gear increases, where:

said angular contact ball ramp is comprised of a plurality of balls on ball races with angled contact axes that are angled with components in both the axial and radial directions to constrain said ring gear concentrically to said clamping ring roller.

9. The planetary traction drive of claim 8 where a ball cage helps locate said plurality of balls in said angular contact ball ramp.

10. The planetary traction drive of claim 8 where diameters of said plurality of balls in said angular contact ball ramp are selected to set a desired preload of normal forces on said slanted traction surfaces on said plurality of planet rollers.

* * * * *